(12) United States Patent
Miyazawa

(10) Patent No.: US 6,901,365 B2
(45) Date of Patent: May 31, 2005

(54) METHOD FOR CALCULATING HMM OUTPUT PROBABILITY AND SPEECH RECOGNITION APPARATUS

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 641 days.

(21) Appl. No.: 09/955,164

(22) Filed: Sep. 19, 2001

(65) Prior Publication Data

US 2002/0055842 A1 May 9, 2002

(30) Foreign Application Priority Data

Sep. 20, 2000 (JP) .................................... 2000-285330

(51) Int. Cl.[7] .............................................. G10L 15/14
(52) U.S. Cl. .................... 704/256; 704/236; 704/240; 706/20
(58) Field of Search .............................. 704/256, 240, 704/236, 230, 222, 239; 706/20

(56) References Cited

U.S. PATENT DOCUMENTS 5,970,445 A * 10/1999 Yamamoto et al. ......... 704/230

* cited by examiner

*Primary Examiner*—Susan McFadden
*Assistant Examiner*—Huyen X. Vo
(74) *Attorney, Agent, or Firm*—Oliff & Berridge, PLC

(57) ABSTRACT

The invention enables even a CPU having low processing performance to find an HMM output probability by simplifying arithmetic operations. The dimensions of an input vector are grouped into several sets, and tables are created for the sets. When an output probability is calculated, codes corresponding to the first dimension to n-the dimension of the input vector are sequentially obtained, and for each code, by referring to the corresponding table, output values for each table are obtained. By substituting the output values for each table for a formula for finding an output probability, the output probability is found.

2 Claims, 7 Drawing Sheets

(a)

(b)

METHOD FOR CALCULATING HMM OUTPUT PROBABILITY AND SPEECH RECOGNITION APPARATUS

BACKGROUND OF THE INVENTION

1. Field of Invention

The present invention relates to an HMM-output-probability calculating method that can, by performing a reduced number of calculations, rapidly calculate the probability of outputting the HMM (hidden Markov Model) for use in speech recognition. The invention also relates to a speech recognition apparatus.

2. Description of Related Art

The HMM is widely used as a phoneme model for performing speech recognition. While the HMM can provide high speech-recognition performance, it has a problem in that it requires a great number of calculations. In particular, to find the probability of outputting the HMM, a large number of calculations is required. Here, concerning input vector Y at a time, when its output probability in a transition from state i to state j is represented by bij(Y), and it is assumed to obey an incorrelated normal distribution, bij(Y) can be expressed by expression (1), which is provided at the end of the specification.

At this time, input vector Y can be expressed by n-dimensional (n is a positive integer) components (LPC cepstrum, etc.) which are obtained by analyzing an input sound at each point of time (time t1, time t2, . . . ), for example, in a length of 20 msec. For example, when input vectors at times t1, t2, t3, . . . are represented by Y1, Y2, Y3, . . . , input vector Y1 at time t1 is represented by ($1y1, 1y2, \ldots, 1yn$), input vector Y2 at time t2 is represented by ($2y1, 2y2, \ldots, 2yn$), and input vector Y3 is represented by ($3y1, 3y2, \ldots, 3yn$).

In expression (1), k represents the number of dimensions of input vector Y at a time and has any value of 1 to n. Also, $\sigma ij(k)$ represents a distribution in k dimensions in the case of states i to j, and $\mu ij(k)$ represents an average in k dimensions in the case of states i to j.

Although output probability can be found by expression (1), there is a possibility that an underflow may occur since, when calculating using expression (1) in an unchanged form, a value obtained by the calculation is too small. Accordingly, when finding the output probability, logarithms are normally used before the finding. When the above expression (1) is expressed by a logarithm having x as a base, it can be expressed by expression (2), which is provided at the end of the specification.

In expression (2), calculation term A can be found by calculation beforehand. Thus, it is expressed by A as a constant, and also $\log_x e$ existing in calculation term B can be expressed by a constant, so that by representing it by Z, expression (2) can be expressed by expression 3, which is provided at the end of the specification.

However, also in expression 3, calculation term B' requiring a large number of calculations, in other words, $[\{yk-\mu ij(k)\}^2/2\sigma ij(k)^2] \cdot Z$ exists. In particular, the above term B' needs to be calculated for each dimension of input vector Y at time t. For example, when it is assumed that input vector Y at time t includes ten-dimensional (n=10) components, it is required that, after performing ten subtractions, ten multiplications, ten divisions, and ten additions, constant Z be multiplied, so that only in this example, the number of calculations is extremely large.

Thus, a large impediment exists to provide small-sized, light-weight, and low-priced products that can perform this large number of calculations. It is therefore impossible to perform speech recognition using the HMM as described above with such hardware.

SUMMARY OF THE INVENTION

Accordingly, an object of the present invention is to enable even a system that has limited hardware capability to use the HMM by simplifying calculations for finding the probability of outputting the HMM (hidden Markov Model) and enabling rapid finding of the output probability.

To achieve the above object, a method for calculating an HMM output probability in accordance with the present invention uses a noncorrelative normal distribution as an output-probability distribution, when an input vector at a time is represented by Y (Y has n-dimensional components, and n is a positive integer), dispersion in k dimensions (k is any natural number from 1 to n) in the case of states i to j is represented by $\sigma ij(k)$, and an average in the k dimensions in the case of states i to j is represented by $\mu ij(k)$, a formula for finding the output probability is given by expression (1), which is provided at the end of the specification, and when expression (1) is expressed, using the logarithms of both sides thereof, by expression (2), which is provided at the end of the specification, the number of calculations of a calculation term represented by $[\{yk-\mu ij(k)\}^2]/2\sigma ij(k)^2 \cdot \log_x e$ in expression (2) is reduced. The method in accordance with the invention includes the steps of creating a code book in which the values in dimensions of input vector Y at a time are represented by sets of representative values, substituting the values in the dimensions (first to n-th dimensions) of input vector Y at the time by codes existing in the code book, and finding, based on the codes, the calculation term represented by $[\{yk-\mu ij(k)\}^2]/2\sigma ij(k)^2 \cdot \log_x e$ by referring to tables. The tables are created for sets formed such that among the first to n-th dimensions, dimensions capable of being treated as each set are collected, and in the table for each set, output values, found based on codes selected for the dimensions existing in the set, have been found as total output values for combinations of all the codes, and the combinations of the codes are correlated with total output values obtained thereby, and based on the codes selected for the dimensions corresponding to one set, by referring to the tables, the total output values which correspond to the combinations of the code for the dimensions are obtained, and the output probability is calculated based on the total output values.

In the method for calculating the HMM output probability, when the numbers of codes in the dimensions in collections of the dimensions capable of being treated as each set are allowed to differ, dimensions having identical numbers of codes are collected to form each set.

In addition, a speech recognition apparatus in accordance with the present invention includes a characteristic analyzer which performs characteristic analyses on an input speech signal and which outputs an input vector at each point of time and components composed of a plurality of dimensions, a scalar quantizer which replaces the components by predetermined codes by performing scalar quantization on received components for the dimensions from the characteristic analyzer, an arithmetic processor which finds an output probability by using output values obtained by referring to tables which are created beforehand and uses the output probability to perform the arithmetic operations required for speech recognition, and a speech-recognition processor which outputs the result of performing speech recognition based on the result of calculation performed by the arithmetic processor. The tables are created for sets formed such that among the first to n-th dimensions, dimensions capable of being treated as each set are collected, and in the table for each set, output values, found based on codes selected for the dimensions existing in the set, have been found as total output values for combinations of all the codes, and the combinations of the codes are correlated with total output values obtained thereby. Based on the codes selected for the dimensions corresponding to one set, by referring to the tables, the arithmetic processor obtains the total output values which correspond to the combinations of the code for the dimensions and calculates the output probability based on the total output values.

As described above, according to the present invention, part of calculation to find the probability of outputting the HMM, particularly, a part having a great number of calculations can be found by referring to tables, whereby the arithmetic operations required to find the output probability can be simplified and the output probability can be found at high speed and with a reduced amount of processing. This enables even a low-processing-performance CPU to function and perform the required calculations.

Also, in the present invention, the dimensions of an input vector are grouped into several sets and a table is created for each set, so that the number of tables can be reduced and post-processing for values obtained by referring to the tables can be further simplified.

In addition, when collections of dimensions are formed, dimensions in which the numbers of codes in the code books corresponding to the dimensions are identical are collected to form each set. This enables the number of codes to differ depending on each dimension such that, when it is assumed that an input vector at a time has, for example, ten-dimensional components, dimensions which have small dimension numbers, such as the first dimension and the second dimension, need to have, to some extent, great numbers of codes in the code books, while dimensions which have large dimension numbers, such as the eighth dimension, the ninth dimension, and the tenth dimension, have smaller numbers of codes in the code books.

By way of example, when the number of codes can be changed depending on each dimension, such as sixteen codes for the code book corresponding to the first dimension and the second dimension, eight codes for each of the third dimension to the sixth dimension, four codes for each of the seventh dimension to the tenth dimension, the first dimension and the second dimension are treated as a set and a table corresponding thereto can be created, the third dimension to the sixth dimension are treated as a set and a table corresponding thereto can be created, and the seventh dimension to the tenth dimension are treated as a set and a table corresponding thereto can be created.

DETAILED DESCRIPTION OF PREFERRED EMBODIMENTS

An embodiment of the present invention is described below. Details described in this embodiment include a description of an HMM-output-probability calculating method and a speech recognition apparatus of the present invention.

As described above, the present invention is intended to simplify calculation for finding the probability of outputting an HMM. Specifically, the present invention is intended to simplify the calculation for finding the probability of outputting the HMM by transforming calculation term B' into a table and referring to the table so that calculation term B' can be found.

Details are described below. In this embodiment, it is assumed that each of input vectors (these are represented by Y1, Y2, Y3, . . . ) at times t1, t2, t3, . . . has ten-dimensional components. For example, input vector Y1 has components $1y1, 1y2, \ldots, 1yn$, input vector Y2 at time t2 has components $2y1, 2y2, \ldots, 2yn$, and input vector Y3 at time t3 has components $3y1, 3y2, \ldots, 3yn$.

Figure 1:
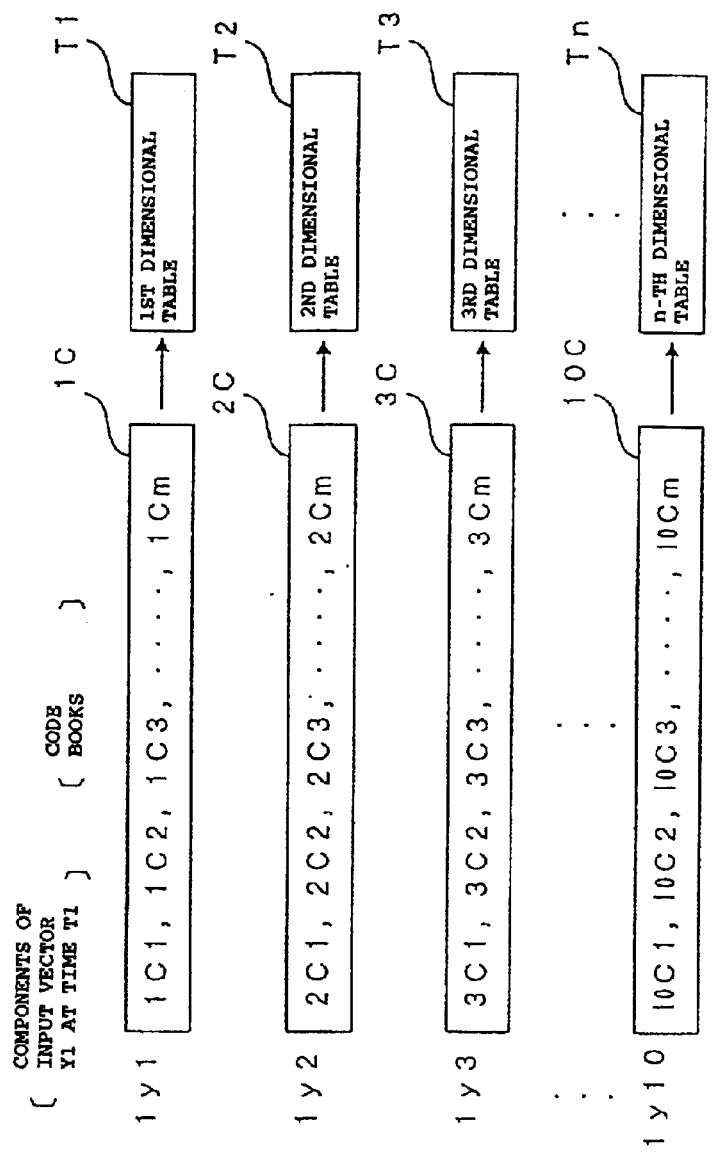
FIG. 1 is a schematic illustrating an embodiment of the present invention and in particular processing for coding components in dimensions of input vector Y1 at time t1.

Each input vector has each code book that represents, as sets of representative values, values in each dimension of first to tenth dimensions. This is shown in FIG. 1. FIG. 1 shows code books corresponding to the components $1y1, 1y2, \ldots, 1y10$ of input vector Y1 at time t1. Input vector Y1 has code books 1C, 2C, . . . , 10C corresponding to the dimensions, such as code book 1C which, for first dimensional component $1y1$, has codes 1C1, 1C2, . . . , 1Cm, code book 2C which, for the second dimensional component, has 2C1, 2C2, . . . , 2Cm, code book 3C which, for the third dimension, 3C1, 3C2, . . . , 3Cm, and code book 10C which, for the tenth dimension, 10C1, 10C2, . . . , 10Cm.

Here, assuming that the size of each code book is 64, m in each code book is 64, and each code book has 64 codes. However, actually, all the dimensions do not always need to have an equal number of codes, and the number of codes can be changed for each dimension.

As described above, by having code books corresponding to dimensions, the ten-dimensional components of each of input vectors Y1, Y2, . . . , Yn at times t1, t2, . . . , tn can be replaced by several codes existing in the code books corresponding to the dimensions.

By way of example, concerning a first dimensional value in input vector Y1 at time t1, by selecting the closest value from code book 1C, it can be replaced by the selected value. Similarly, concerning a second dimensional value in input vector Y1, by selecting the closest value from code book 2C, it can be replaced by the selected value.

Similarly, a component in each dimension of an input vector at each point of time can be replaced by any of m codes in a code book corresponding thereto as in a case in which, concerning also the value of first dimensional code $2y1$ in input vector Y2 at time t2, by selecting the closest value from code book 1C, it can be replaced by the selected value.

After replacing the code by any of codes in the code book, expression (3), which is provided at the end of the specification, can be expressed as expression 4, which is also provided at the end of the specification:

In expression (4), kCc represents a replaced code, k represents a dimension and has any of values from 1 to n if k has dimensions from 1 to n, and c represents a code number and has any of values from 1 to m if the code book size is m.

Calculation term D in expression (4) can be found as a value in each dimension beforehand, whereby an output table is created. Specifically, calculation term D in expression (4) includes "$\sigma ij(k)$", "$\mu ij(k)$", "kCc", and "Z". "$\sigma ij(k)$" represents a distribution in k dimensions in the case of states i to j, as described above, and "$\mu ij(k)$" represents an average in the case of states i to j. These can be found beforehand by calculation, and Z is formed as a constant. Since kCc is a code which exists in code books corresponding to dimensions, 1C, 2C, . . . , nC, it can be used.

By using "$\sigma ij(k)$" and "$\mu ij(k)$" in each dimension and "Z" which is formed as a constant, and using m codes existing in the dimension, calculation term D can be calculated. For example, by using codes 1C1 to 1Cm (m=64) in code book 1C so that calculation term D in expression (4) can be calculated beforehand, the results (these are here called output values) of calculating calculation term D which respectively correspond to codes 1C1 to 1Cm can be obtained and are formed as a table (this is called first dimensional table T1).

In addition, by using codes 2C1 to 2Cm (m=64) in code book 2C so that calculation term D in expression (4) can be calculated beforehand and are formed as a table (this is called second dimensional table T2).

In this manner, n output tables (T1 to Tn) corresponding to dimensions 1 to n are created, and each of these tables T1 to Tn has m output values corresponding to m codes in each of dimensions 1 to n.

Accordingly, by obtaining input vector Y at a time and obtaining components in each dimension of input vector Y, a scalar-quantized code for each dimension can be obtained, and by referring, based on the code, to a table corresponding to the dimension, calculation term D in expression (4) can be found.

By way of example, when code 1C3 is selected correspondingly to first dimensional component $1y1$ of input vector Y1 at time t1, the code 1C3 is used to refer to first dimensional table T1, whereby a first dimensional output value in calculation term D is found, and similarly, when code 2C16 is selected correspondingly to second dimensional component $1y2$ of input vector Y1 at time t1, the code 2C16 is used to refer to second dimensional table T2, whereby a second dimensional output value in calculation term D is found.

Figure 2:
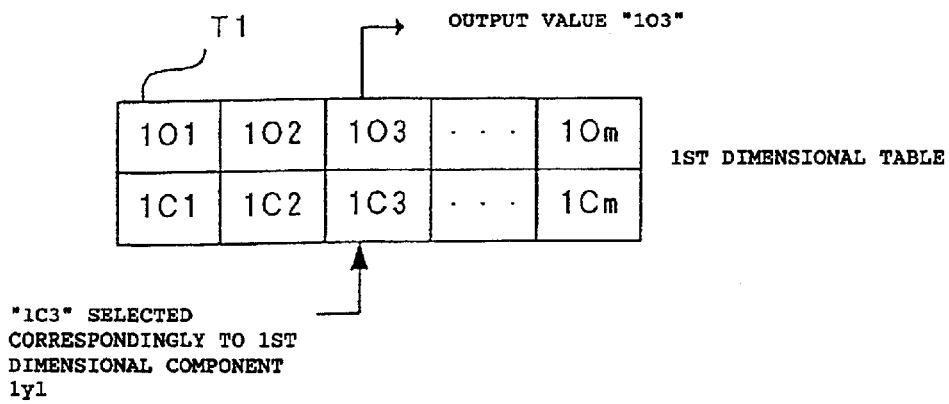
FIGS. 2(a) and (b) are schematics illustrating processing that, by using codes by coding using the codebooks shown in FIG. 1 to refer to tables, finds calculation term D in expression (4) in accordance with the embodiment of the invention.
Figure 2:
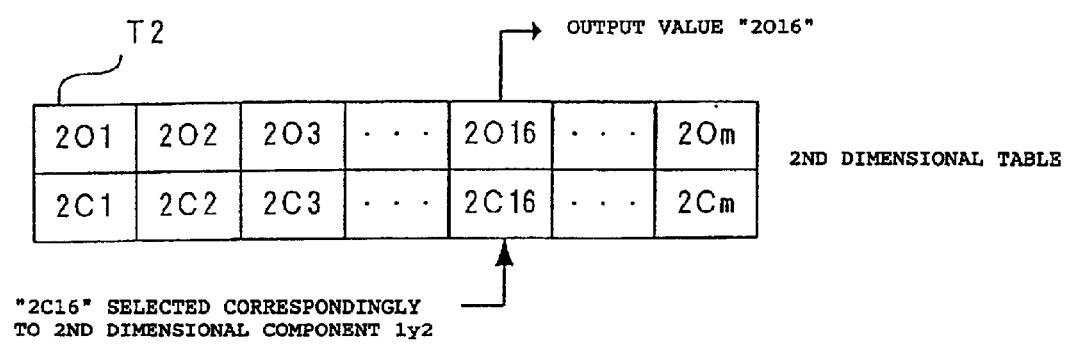

This is described using FIGS. 2(a) and 2(b). As shown in FIG. 2(a), a first dimensional component of input vector Y1 at time t1 is represented by $1y1$, and it is assumed that, based on $1y1$, code 1C3 is selected from code book 1C. Next, based on code 1C3, by referring to first dimensional output table T1, output value 1O3 is obtained. This output value 1O3 is found beforehand from calculation term D in expression (4).

Similarly, as shown in FIG. 2(b), a second dimensional component of the same input vector Y1 is represented by $1y2$, and it is assumed that, based on $1y2$, code 1C16 is selected from code book 2C. Next, based on this code 1C16, by referring to second dimensional table T2, output value 2O16 is obtained. This output value 2O16 is found beforehand from calculation term D in expression (4).

By repeatedly performing the above manner, an output value in each dimension is obtained. Output values for dimensions (output values for the dimensions are here represented by O1, O2, O3, . . . , On for brevity of description) are added together (O1+O2+, . . . , +On). The O1+O2+, . . . , +On is the result of calculating calculation term E in expression (4). Thus, by using the sum to calculate the entirety of expression (4), output probability bij(Y) on input vector Y at a time is found.

By performing the above processing, the calculation required for obtaining term E in expression (4) needs processing that refers to a code book once for one dimension, and, after performing processing that, based on the result, refers to any table among tables T1 to Tn, adding the obtained output values together. For example, in the case of ten dimensions, processing is only required which refers to a code book ten times for each dimension, refers to a table ten times, and adds the ten obtained output values together.

The foregoing is a description of basic processing for describing the present invention, in which, by obtaining calculation term D in expression (4) by referring to tables T1 to Tn created for dimensions, and adding output values for the dimensions together, calculation term E in expression (4) is obtained. Although such a calculation technique may be found in a related art, the present invention is one obtained by further developing this thought progression and enables the efficient finding of an output probability by using a reduced number of calculations. The following is a description of the present invention.

The present invention does not have the above-described output table for each dimension and instead groups dimensions, which can be treated as the same set, among dimensions 1 to n, and has tables for the sets.

Figure 3:
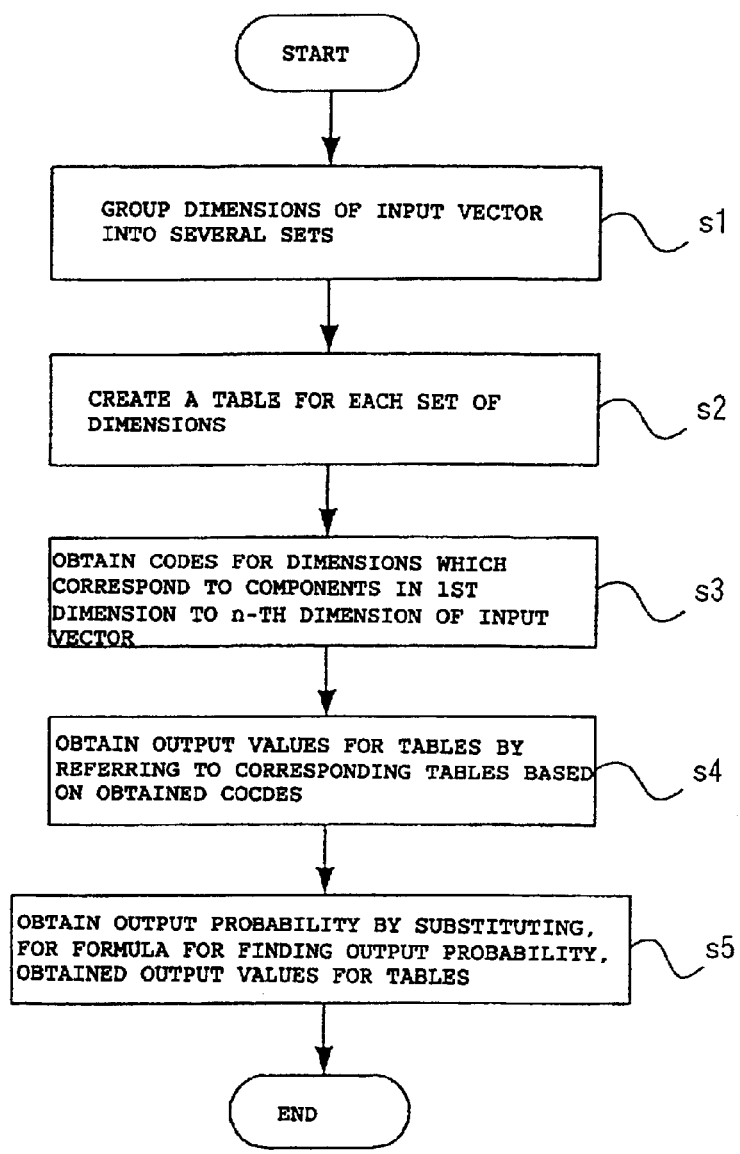
FIG. 3 is a flowchart illustrating an outline process for finding the output probability of HMM corresponding to an embodiment of the present invention.

FIG. 3 is a flowchart showing the outline of an output probability calculating process of the present invention. Among dimensions 1 to n of an input vector, dimensions which can be treated as each set are grouped into several sets (step s1), and a table is created for each set (step s2). When calculating an output probability, codes which correspond to components for first dimension to n-th dimension of the input vector are sequentially obtained from corresponding code books (step s3), and based on the codes, by referring to the corresponding tables, output values for the tables are obtained (step s4). By substituting the output value for each table for a calculating expression (expression (4)), the output probability is found (step s5). Details are described below.

When a code book in which the components for each dimension of the input vector at each point of time are scalar-quantized is created, the number of codes can be changed for each dimension, as described above. For example, when it is assumed that an input vector at each point of time has ten-dimensional components, each of dimensions which have small dimension numbers, such as the first dimension and the second dimension, may have a larger number of codes in the code book, while each of dimensions which have large dimension numbers, such as the eighth dimension, the ninth dimension, and the tenth dimension, may have a smaller number of code in the code book.

In a case in which the input vector is a ten-dimensional LPC cepstrum coefficient, one example is that the number of codes can be changed, such as sixteen codes for each code book corresponding to both the first dimension sixteen codes for also the second dimension, eight codes for the code book corresponding to the third dimension, eight codes also for the fourth dimension, eight codes also for the fifth dimension and the sixth dimension, four codes for the seventh dimension, four codes also for the eighth dimension, and four codes for the ninth dimension and the tenth dimension.

Accordingly, when each set is generated, it is convenient to group dimensions by the same number of codes because in this case, the number of codes for both the first dimension and the second dimension is sixteen, the number of codes for the third dimension to the sixth dimension is eight, and the number of codes for the seventh dimension to the tenth dimension. For convenience of description, a set for the first dimension and the second dimension is called first set V1, a set for the third dimension to the sixth dimension is called second set V2, and a set for the seventh dimension to the tenth dimension is called third set V3.

For these first to third sets V1, V2, and V3, tables (first table T10, second table T20, third table T30) are created.

First table T10 stores, for each combination of all codes existing in code books 1C and 2C, the sum (10 m+20 m) of an output value (this is represented by 10 m) which corresponds to a code (this is represented by 1Cm) selected from code book 1C corresponding to first dimensional component $y1$ of input vector Y at a time and an output value (this is represented by 20 m) which corresponds to a code (this is represented by 2Cm) selected from code book 2C corresponding to second dimensional component $y2$ of input vector Y at the same time.

In other words, for all the codes existing in code book 1C, calculation term D in expression (4) is found, and for all the codes existing in code book 2C, calculation term D in expression (4) is found. Each output value 10 m+20 m is calculated beforehand which corresponds to each combination of all the codes existing in code books C1 and C2.

Figure 4:
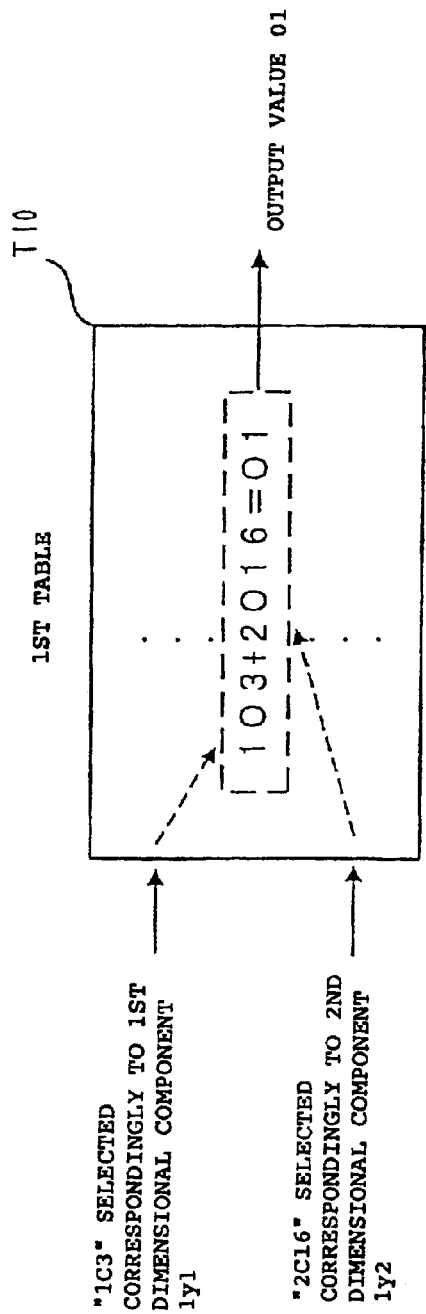
FIG. 4 is a schematic illustrating processing (processing for a first dimension and a second dimension) that, by referring to tables, finds calculation term D in expression (4) in accordance with an embodiment of the present invention.

This is specifically described using FIG. 4.

By way of example, it is assumed that code 1C3 is selected from code book 1C correspondingly to first dimensional component $1y1$ of input vector Y1 at time t1 and it is assumed that code 2C16 is selected from code book 2C correspondingly to second dimensional component $1y2$ of input vector Y1 at the same time.

At this time, it is assumed that calculation term D in expression (4) which corresponds to code 1C3 has already been found and the output value thereof is 1O3 and it is assumed that calculation term D in expression (4) which corresponds to code 2C16 has already been found and the output value thereof is 2O16. Also, the sum "1O3+2O16" of these output values has already been calculated (represented by 1O3+2O16=O1), and the sum is stored in first table T10. Accordingly, by using code 1C3 selected for first dimensional component $1y1$ and code 2C16 selected for second dimensional component $1y2$ to refer to first table T10, "1O3+2O16", in other words, "O1" is read in this case.

This applies to output tables for other sets. In each dimension belonging to each set, for all codes existing in the dimension, calculation term D in expression (4) has already been found and a total output value for each combination of all the codes in the dimension existing in each set has been calculated.

Figure 5:
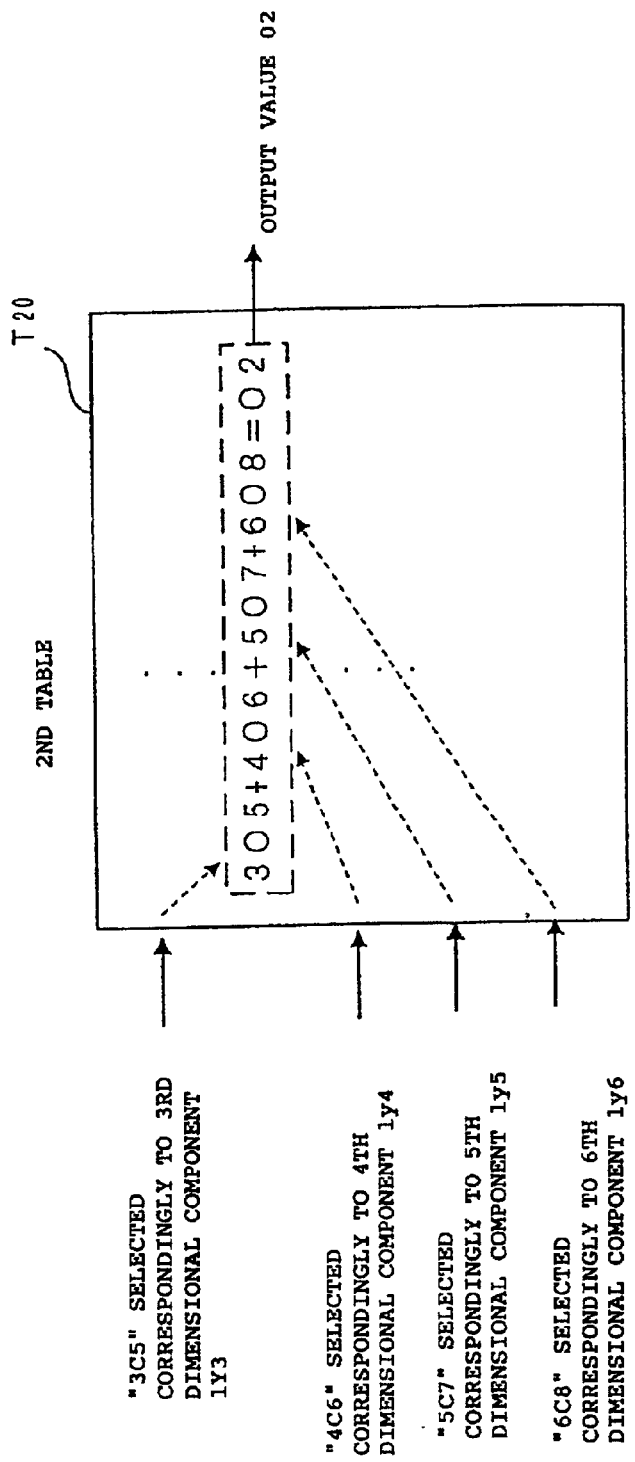
FIG. 5 is a schematic illustrating processing (processing for a third dimension to a sixth dimension) that, by referring to tables, finds calculation term D in expression (4) in accordance with an embodiment of the present invention.

By way of example, as shown in FIG. 5, it is assumed that for third dimensional component $1y3$ of input vector Y1 at time t1, code 3C5 is selected from code book 3C and it is assumed that for fourth dimensional component $1y4$ of input vector Y1 at the same time, code 4C6 is selected from code book 4C. In addition, it is assumed that for fifth dimensional component $1y5$ of input vector Y1 at the same time, code 5C7 is selected from code book 5C and it is assumed that for sixth dimensional component $1y6$ of input vector Y1 at the same time, code 6C8 is selected from code book 6C.

At this time, it is assumed that for code 3C5, 3O5 has been found as the output value by using calculation term D in expression (4), it is assumed that for code 4C6, 4O6 has been found as the output value by using calculation term D in expression (4), it is assumed that for code 5C7, 5O7 has been found as the output value by using calculation term D in expression (4), and it is assumed that for code 6C8, 6O8 has been found as the output value by using calculation term D in expression (4).

In addition, 3O5+4O6+5O7+6O8 has already been calculated (represented by 3O5+4O6+5O7+6O8=O2), and the sum is stored in second table T20. Accordingly, by referring to table T20 based on code 3C5 for the third dimensional component, code 4C6 for the fourth dimensional component, code 5C7 for the fifth dimensional component, and code 6C8 for the sixth dimensional component, "3O5+4O6+5O7+6O8", in other words, "O2" is read as an output value in this case.

Figure 6:
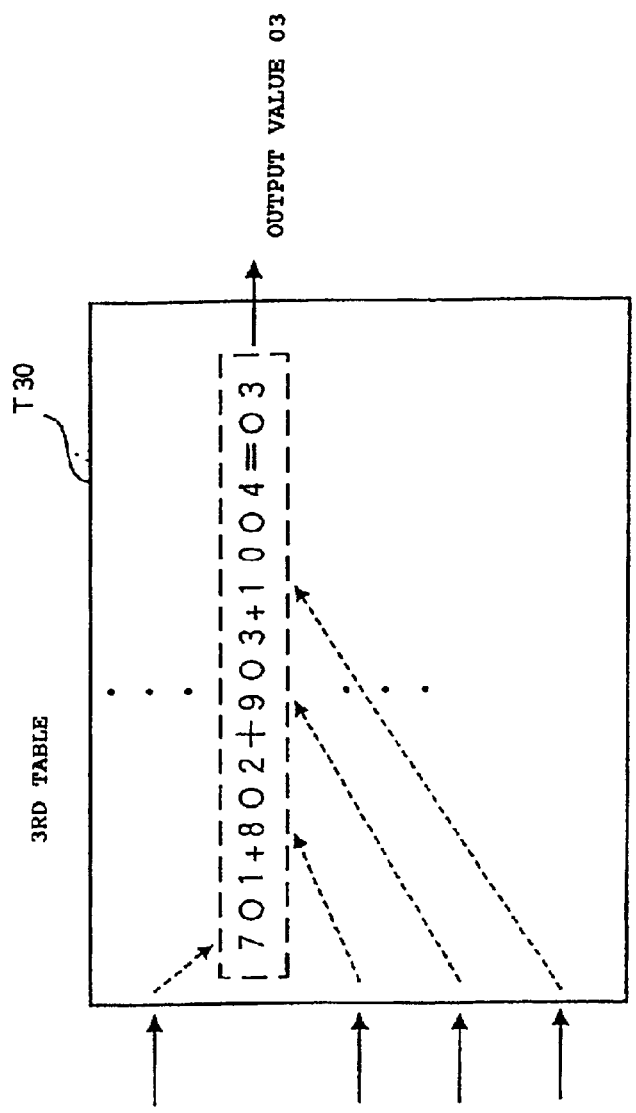
FIG. 6 is a schematic illustrating processing (processing for a seventh dimension to a tenth dimension) that, by referring to tables, finds calculation term D in expression (4) in accordance with an embodiment of the present invention.

As shown in FIG. 6, it is assumed that for seventh dimensional component $1y7$ of input vector Y1 at time t1, code 7C1 is selected from code book 7C and it is assumed that for eighth component $1y8$ of input vector Y1 at the same time, code 8C2 is selected. Also, it is assumed that for ninth component $1y9$ of input vector Y1 at the same time, code 9C3 is selected from code book 9C and it is assumed that for tenth dimensional component $1y10$ of input vector Y1 at the same time, code 10C4 is selected from code book 10C.

At this time, it is assumed that for code 7C1, 7O1 has been found as the output value thereof by using calculation term D in expression (4), it is assumed that for code 8C2, 8O2 has been found as the output value thereof by using calculation term D in expression (4), it is assumed that for code 9C3, 9O3 has been found as the output value thereof by using calculation term D in expression (4), and it is assumed that for 10C4, 10O4 has been found as the output value thereof by using calculation term D in expression (4).

In addition, 7O1+8O2+9O3+10O4 has already been calculated (represented by 7O1+8O2+9O3+10O4=O3), and the sum is stored in third table T30. Accordingly, by referring to third table T30 based on code 7C1 for the seventh dimensional component, code 8C2 for the eighth dimensional component, code 9C3 for the ninth dimensional component, and code 10C4 for the tenth dimensional component, "7O1+8O2+9O3+10O4", in other words, "O3" is read in this case.

As described above, the first to tenth dimensions are divided into three sets (first set V1, second set V2, third set V3), the first set V1, the second set V2, and the third set V3 have tables (first table T10, second table T20, third table T30), respectively. Thus, a code corresponding to each dimension, which is selected from a code book for a dimension belonging to the first, second, third sets V1, V2, and V3, is input to the corresponding table, whereby a total output value is obtained which corresponds to an input combination of codes.

Thereby, if an output value from table T10 corresponding to first set V1 is O1, an output value from table T20 corresponding to second set V2 is O2, and an output value from table T30 corresponding to third set V3, the totaling of the three output values O1, O2, and O3 completes the calculation of calculation term E in expression (4). Specifically, the processing required for calculation term E in expression (4) needs, in the case of ten dimensions, ten-times code-book reference, three-times table reference, and three-times table reference, so that the number of calculations can be greatly reduced.

After finding calculation term E in expression (4), by using it to calculate the entirety of expression (4), the probability of outputting state i to state j of an input vector at time t1 can be found.

As described above, the processing required for finding calculation term E in expression (4) in the case of finding the output probability can be simplified by simply referring to a code for each dimension, using the obtained code to refer to some (three in the above case) tables which are treated as a set for dimensions, and adding the obtained values together, so that the number of calculations is greatly reduced, which can be sufficiently performed by a CPU having low processing performance.

The foregoing description concerns one normal distribution. However, the present invention can be applied to a mixed continuous distribution HMM using a plurality of normal distributions. This is described below.

In the present invention, by preparing m coded normal distributions (m typical normal distributions are coded and processed in the form of a code book, and dispersion and average of normal distributions corresponding to codes are found beforehand) which are common to all phonemes, the probability of outputting a phoneme in dimension yk of input vector Yt at time t in state ij can be found.

The m (e.g., 256) coded normal distributions can be used in common for all phonemes. The probability of outputting a phoneme for each state ij can be found by selecting a plurality of normal distributions from the code book, as required. When the output probability in the case of using the m-th normal distribution is represented by bm(Y), bm(Y) can be expressed by expression 5, which is provided at the end of the specification.

In expression (5), Wijm is a weight for the m-th normal distribution in state ij on each phoneme.

Expression (5) can be expressed by expression 6, which is also provided at the end of the specification, using logarithms, as described above. In expression (6), calculation term A can be found beforehand by calculation. Thus, it is treated as a constant and is represented by A, and logxe in calculation term B can be represented by a constant. Thus, when it is represented by Z, expression (6) can be expressed by expression 7, which is provided at the end of the specification.

In addition, when yk in calculation term B' in expression (7) is coded using scalar quantization, as described above, and is represented by kCc, expression (7) can be expressed by expression 8, which is provided at the end of the specification.

In expression (7) and expression (8), logxWijm can be treated as a constant since it can be found beforehand by calculation.

Calculation term D in expression (8) is processed in the form of a table so that it can be found by referring to the table. This has been fully described, so that the description is omitted here.

As described above, in the present invention, by preparing m coded normal distributions which are common to all phonemes, the probability of outputting a phoneme in a dimension of an input vector at a time in state ij can be easily found.

Figure 7:
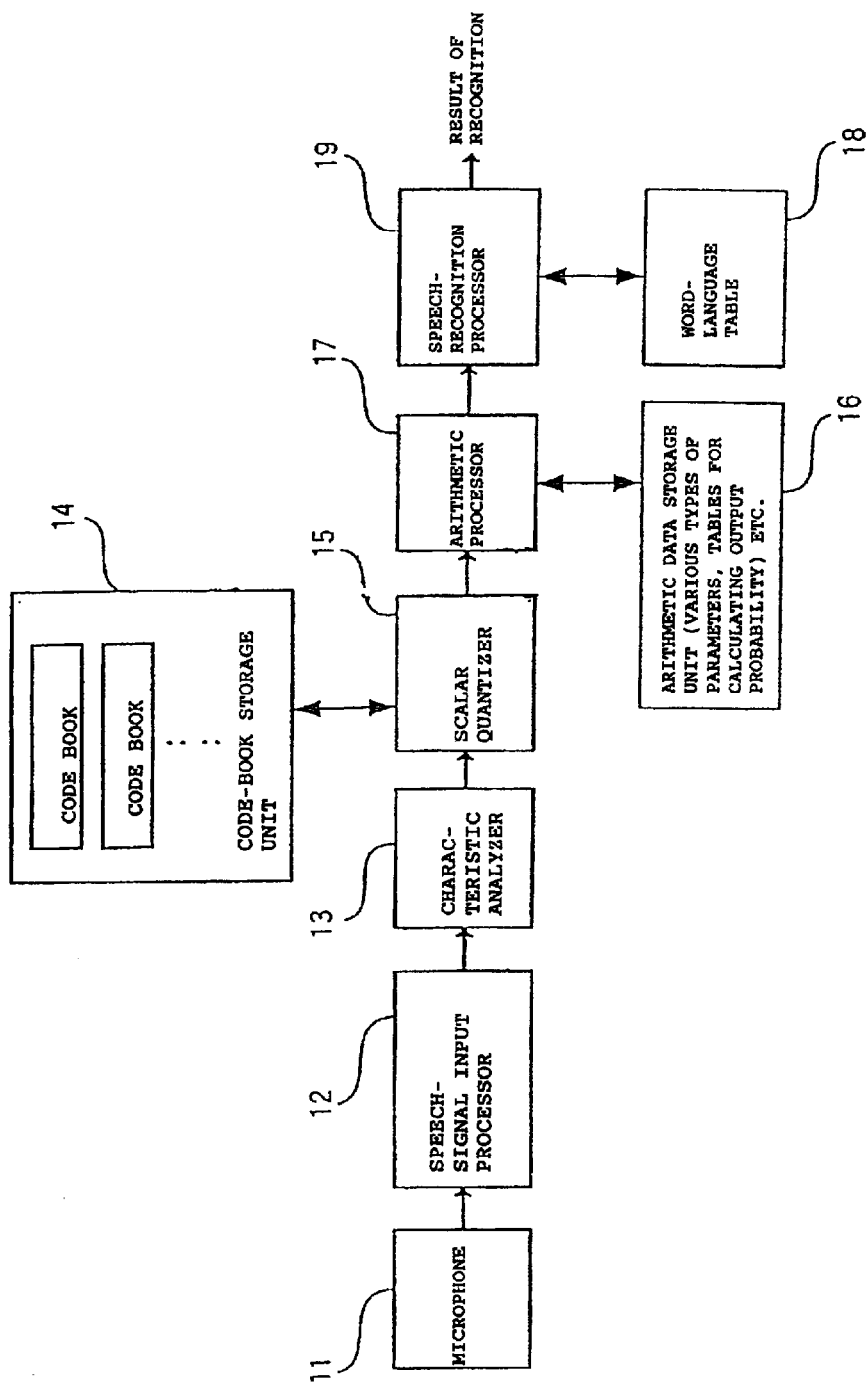
FIG. 7 is a schematic briefly showing an embodiment of a speech recognition apparatus in accordance with the present invention.

FIG. 7 shows a schematic structure of a speech recognition apparatus to which the above-described HMM output probability calculating method is applied, and the structure includes a microphone 11 as a speech input unit, a speech-signal input processor 12 that amplifies and A/D conversion of an input speech signal, a characteristic analyzer 13 that performs processing that, after performing characteristic analyses on the speech signal processed by the speech-signal input processor 12, outputs an input vector for each time t and its components (e.g., ten-dimensional LPC cepstrum), a scalar quantizer 15 which receives components for each dimension from the characteristic analyzer 13 and which performs scalar quantization referring to code books for dimensions which are stored in a code-book storage unit 14 (e.g., code books 1C, 2C, ..., 10C shown in FIG. 1), an arithmetic data storage unit 16 that stores various types of data, such as various parameters ($\sigma$ij, $\mu$ij, etc., in dimension k in the case of state ij) which are necessary for HMM calculation, and the above tables (first, second, and third tables T10, T20, and T30), an arithmetic processor 17 that, based on the various types of data stored in the arithmetic data storage unit 16 and the quantized result (code selected from a code book corresponding to a component in each dimension) by the scalar quantizer 15, performs HMM calculation, and a speech-recognition processor 19 that outputs the result of performing speech recognition using the result calculated by the arithmetic processor 17 and a word-language table 18.

In the process for finding the output probability, which is one of processes performed by the arithmetic processor 17, as described above, by referring to tables (first, second, and third tables T10, T20, and T30 in the above example) based on a code selected by the scalar quantizer 15 so that an output value for each table is found, using the value to calculate the output probability, and using the output probability, a final output likelihood is obtained. This is performed for a phoneme at each point of time. The speech-recognition processor receives an output from the arithmetic processor 17 and performs speech-recognition processing on the input speech.

As described above, a speech recognition apparatus of the present invention finds the output probability by using the HMM output probability calculating method described using FIG. 1 to FIG. 6. This can greatly simplify calculation for finding the output probability, which allows the output probability to be found at high speed, and which can be sufficiently performed by a CPU having low processing performance. Thus, inexpensive hardware can be used to perform HMM-used speech recognition.

The present invention is not limited to the above-described embodiment, and instead can be variously modified without departing from the spirit of the present invention. For example, although the embodiment has described speech recognition, the present invention can be applied to pattern recognition in the case of performing image recognition. A processing program is created which describes a process for implementing the above-described HMM-output-probability calculating method of the present invention, and the processing program may be recorded on a recording medium such as floppy dick, optical disk, or hard disk. The present invention also includes the recording medium. Alternatively, the processing program may be acquired from a network.

As described above, according to the present invention, part of calculation for finding the probability of outputting the HMM, particularly, a part having a great number of calculations can be found by referring to tables, whereby the arithmetic operations required for finding the output probability can be simplified and the output probability can be found at high speed and with a reduced amount of processing. This enables even a low-processing-performance CPU to function. Also, in the present invention, the dimensions of an input vector are grouped into several sets and a table is created for each set, so that the number of tables can be reduced and post-processing for values obtained by referring to the tables can be further simplified.

Accordingly, the present invention greatly simplifies calculation for finding the probability of outputting the HMM so that the output probability can be found at high speed, and enables even a low-processing-performance CPU to function sufficiently.

What is claimed is:

1. A method for calculating an HMM output probability for speech recognition, comprising:

using a noncorrelative normal distribution as an output-probability distribution, which, when an input vector at a time is represented by Y (Y has n-dimensional components, and n is a positive integer), dispersion in k dimensions (k is any natural number from 1 to n) in the case of states i to j is represented by σij(k), and an average in the k dimensions in the case of states i to j is represented by μij(k), a formula for finding the output probability being provided by: expression 1:

$$b_{ij}(Y) = \prod_{k=1}^{n}\left(\frac{1}{2\pi\sigma_{ij}(k)^2}\right)^{\frac{1}{2}} \cdot e^{-\sum_{k=1}^{n}\left[\frac{\{y_k-\mu_{ij}(k)\}^2}{2\sigma_{ij}^2(k)}\right]} \quad (1)$$

using the logarithms of both sides thereof, by: expression 2:

$$\log_x b_{ij}(Y) = \underbrace{\log_x\left[\prod_{k=1}^{n}\left(\frac{1}{2\pi\sigma_{ij}^2(k)}\right)^{\frac{1}{2}}\right]}_{A} - \underbrace{\sum_{k=1}^{n}\overbrace{\left[\frac{\{y_k-\mu_{ij}(k)\}^2}{2\sigma_{ij}^2(k)}\right] \cdot \log_x e}^{B'}}_{B} \quad (2)$$

reducing the number of calculations of a calculation term represented by [{yk−μij(k)}2]/2σij)2·logxe in expression (2) by:

creating code books in which the values in dimensions of input vector Y at a time are represented by sets of representative values;

substituting the values in the dimensions (first to n-th dimensions) of input vector Y at said time by codes existing in said code books;

finding, based on the codes, the calculation term represented by [{yk−μij(k)}2]/2σij(k)2·logxe by referring to tables;

creating said tables for sets formed, such that among the first to n-th dimensions, dimensions capable of being treated as each set being collected, and in the table for each set, output values, found based on codes selected for the dimensions existing in the set, being found as total output values for combinations of all the codes, and the combinations of the codes being correlated with total output values obtained thereby;

based on the codes selected for the dimensions corresponding to one set, by referring to said tables, obtaining the total output values which correspond to the combinations of the code for the dimensions;

calculating the output probability based on the total output values; and applying the calculated output probability to speech recognition.

2. The method for calculating an HMM output probability as set forth in claim 1, further including: when the numbers of codes in the dimensions in collections of the dimensions capable of being treated as each set are allowed to differ, collecting dimensions having identical numbers of codes to form each set.

* * * * *